United States Patent [19]

Smagghe et al.

[11] 4,007,908
[45] Feb. 15, 1977

[54] PROCESS AND DEVICE FOR ATTENUATING NOISE CAUSED BY A VALVE DURING THE EXPANSION OF A FLUID

[75] Inventors: Paul V. Smagghe, Colombes; Raymond B. Villier, Conde-sur-Noireau, both of France

[73] Assignee: Masoneilan International, Inc., Norwood, Mass.

[22] Filed: May 9, 1975

[21] Appl. No.: 576,033

[52] U.S. Cl. .............................. 251/127; 138/41
[51] Int. Cl.$^2$ ................................. F16K 47/08
[58] Field of Search .......... 251/123, 124, 127, 118; 138/41

[56] References Cited

UNITED STATES PATENTS

| | | | |
|---|---|---|---|
| 1,868,708 | 7/1932 | Hunt | 251/118 X |
| 3,724,502 | 4/1973 | Hayner | 138/41 |
| 3,731,903 | 5/1973 | Webb et al. | 251/127 X |
| 3,792,609 | 2/1974 | Blair et al. | 138/41 X |

FOREIGN PATENTS OR APPLICATIONS

| | | | |
|---|---|---|---|
| 731,246 | 2/1943 | Germany | 138/42 |
| 1,094,542 | 12/1960 | Germany | 251/118 |
| 1,650,401 | 10/1970 | Germany | 251/127 |
| 2,018,680 | 11/1971 | Germany | 251/127 |

*Primary Examiner*—Arnold Rosenthal
*Attorney, Agent, or Firm*—Robert A. Townsend

[57] ABSTRACT

Sinuous passage method and means of attenuating the noise generated by the expansion of a fluid through a valve. A winding-passage-incorporating tubular element provided between the valve and the downstream pipe. For attenuating the noise generated by a pressure reducing valve, or other fluid expanding restriction, a device having its inlet end substantially engaging the downstream face of the valve, and comprising a tubular element enclosing a plurality of lengthwise partitions, and between said partitions a plurality of transverse, flow deflecting means defining with said partitions a plurality of individual, continuous, zigzag passages. For reducing the noise generated by control valves, a wire grille spanning the downstream passage and comprising one or more transverse layers of generally uniformly spaced wires extending generally in one transverse direction, alternating with one or more transverse layers of generally uniformly spaced wires extending generally in another transverse direction, the alternate, successive layers rigidly joined together at the points of wire overlapping, any successive two of said layers combining to complete a multiplicity of wire mesh openings, and said layers extending in one or both said transverse directions being successively transversely displaced whereby said openings successively define a continuously winding path for said fluid.

9 Claims, 11 Drawing Figures

PROCESS AND DEVICE FOR ATTENUATING NOISE CAUSED BY A VALVE DURING THE EXPANSION OF A FLUID

BACKGROUND OF THE INVENTION

The present invention has as objects a process and a device for attenuating the noise produced at the time of the expansion of a fluid by a valve comprising a plug, or by any other restriction.

It is known that when a stream of fluid is subjected to a process of "throttling" in order to reduce pressure, there is produced, in the case of a compressible fluid, a shock wave giving rise to a noise which is the more intense the higher the speed of the fluid, and, in the case of an incompressible fluid, to a cavitation phenomenon, the magnitude of which is likewise related to the speed of the fluid.

In order to mitigate this disadvantage, it has already been proposed to provide, inside the valves, baffles or labyrinths which assure successive expansions of the fluid while maintaining the flow rate at a lower, substantially constant value. The result of this is that the noise due to throttling and the cavitation are equally reduced. If valves of this type represent considerable progress with respect to the classical valves, they have the disadvantage of being expensive to construct. Besides, the efficiency of the means used is limited by the cavity of said valve.

SUMMARY OF THE INVENTION

It is to be understood that in the present description and in the claims the word "valve" refers not only to the devices properly called valves, but to all restricting mechanisms.

The object the invention has set for itself is to propose novel means for attenuating noise or cavitation phenomena, means which would be easy to make, of low cost price, and the importance of which could be increased at will as a function of the needs.

This object has been achieved by the process according to the invention which consists, as in the past, of constraining the stream of fluid to flow through at least one winding passage, but according to which this sinuous flow is realized downstream of the valve, and not inside the valve itself.

In other words, to the valve, are connected attenuating means which define at least one winding passage for the fluid, these means being comprised inside a tubular element linking the part of the valve located directly below the plug to the pipe downstream.

In this manner, the volume of the attenuating means is not limited by that of the valve. Moreover, it is easier to insert these attenuating means into an ordinary tubular element than to fit them into the cavity of the valve.

The winding passages are of constant cross section if the fluid to be transported is not compressible, and of increasing cross section if the fluid is compressible. In this latter case, the increase of the cross section makes it possible to maintain a relatively constant speed of flow.

As a variation, the tubular element can be cylindrical even if the winding passages are of increasing cross section, by giving an increasing "porosity" to the attenuating means, from upstream towards downstream.

According to a first form of carrying out the invention, the means for attenuating the noise are composed of a series of partitions which diverge with respect to the longitudinal axis of the tubular element and which, among themselves, define zigzag passages separated from each other; at one of their ends, these passages communicate with the outlet from the valve and at their other end with the pipe downstream.

When the tubular element is divergent, the series of partitions form a block of a truncated-cone shape which is capable of being enclosed in said divergent tubular element. It will be understood that, in this first design, the fluid circulates in one or several zigzag passages, depending upon the adjustment of the valve, these passages being separated from each other.

According to the second form of carrying out the invention, said means for attenuating the noise are composed of a series of perforated plates, each consisting of a trellis of criss crossed wires, said plates being, on the one hand, arranged transversely with respect to the longitudinal axis of the tubular element and, on the other hand, so juxtaposed to each other that the criss crossed wires of each plate are displaced with respect to those of the preceding and following plates.

The method of constructing the trellis is of importance in the flow of the fluid: it is preferably such that, in one plane, the fluid will meet only wires parallel to each other.

Thus, a lattice resulting from the welding of a first layer of wires, parallel to each other and spaced from each other, onto a second layer, similar to the first one, and the wires of which are substantially perpendicular to those of the first layer. It then looks like the lattices used as reinforcement for concrete walls.

Alternatively, the trellis results from the welding of a first layer of wires in groups of two, parallel to each other and spaced with respect to the neighboring groups, onto a second layer which is similar to the preceding one, and the wires of which are substantially perpendicular to those of the first layer.

This other lattice has the advantage of opposing more elliptical obstacles to the stream of fluid (two wires side-by-side do indeed have a more elongated profile than does a single wire of the same cross section).

In contrast to the preceding case, according to the second form of carrying out the invention the fluid which has been admitted through one or several holes of the first perforated plate, depending upon the adjustment of the valve, spreads into all the passages defined between the perforated plates, moving around the obstacles formed by the wires of the lattice.

Advantageously, the means for attenuating the noise according to the second design are carried out by axially juxtaposing a series of "pancakes," each made of a series of these perforated plates joined to each other. In this way, small elements, of simple construction, are available, and they are placed side by side, in any desired number.

According to a third form of carrying out the invention, the means for attenuation are composed of the combination, on the one hand, of a series of plane partitions diverging with respect to the longitudinal axis of the tubular element and bounding separate passages between them; and, on the other hand, a series of grids composed of bars perpendicular to said longitudinal axis, joining said partitions at intervals.

This third form of execution is midway between the first and the second. As in the first, the means for attenuation comprise a series of separate passages, but the zigzag configuration of these passages, provided in said first form, is replaced by the presence of the bars which compel the fluid to move around them.

As in the preceding case and for the same reasons, it is preferred to achieve this other type of attenuating means by axial juxtaposition of a series of truncated-cone blocks, each formed in this type of a combination of partitions and of grids made of bars, said partitions being in each other's prolongation, from one block to the other.

A cylindrical portion possibly follows the truncated-cone part of the divergent tubular element, when such a divergent element is used in realizing the device according to the invention.

In this case, the attenuating means as they have been defined above are completed by a cylindrical piece which is lodged in the cylindrical prolongation of the divergent tubular element, and through which go a series of passages of constant cross section, parallel to the axis of said element, and the total cross section of which is at least equal to the largest total cross section of the sinuous passages. This cylindrical piece has the function of rendering the outflow speed of the fluid uniform.

The device according to the invention offers the advantage of permitting the use as regulating valves of valves such as scoop valves, guillotine-type valves, flap valves, and valves with rotating or spherical clapper. It is known that valves of the type cited above are not expensive, but that at the present state of technology, they cannot be used as regulating valves. Indeed, the variation of flow as a function of the opening (at constant pressure drop) of valves of this type is not sufficiently progressive. This defect is corrected by inserting, downstream of these valves, a device according to the present invention, which diffuses the stream of fluid received from the valves.

BRIEF DESCRIPTION OF THE DRAWINGS

Below, the invention is described in detail, with reference to the appended drawings in which:

FIG. 1b is a section along Line 1b—1b of the attenuating device represented in FIG. 1a;

FIG. 2b is a section along Line 2b—2b of FIG. 2a;

FIG. 3b is a section along Line 3b—3b of FIG. 3a;

DESCRIPTION OF THE PREFERRED EMBODIMENTS

Figure 1A:
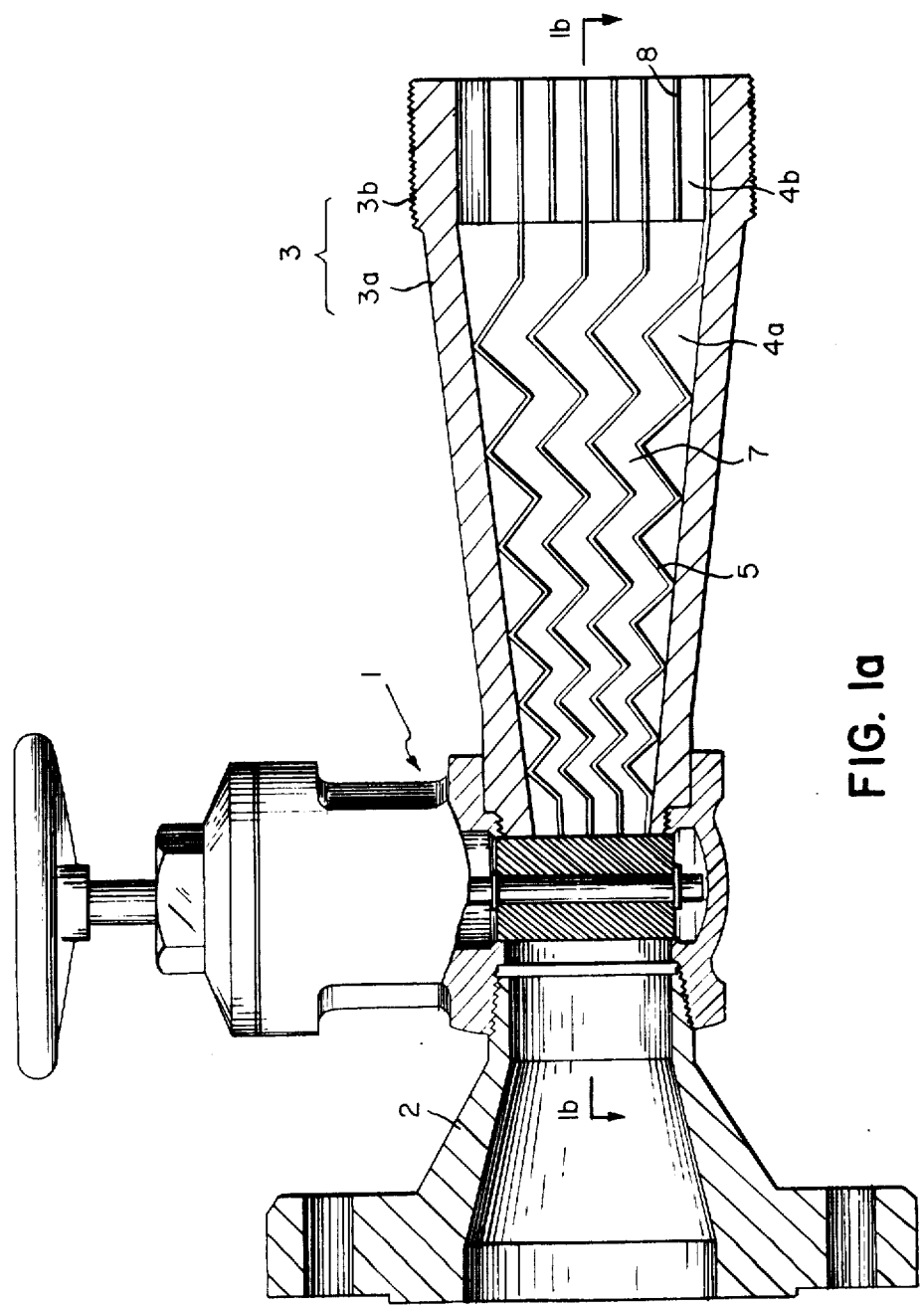
FIG. 1a represents, in vertical section, a valve and, associated with it, the device according to the invention, in its first design.
Figure 1B:
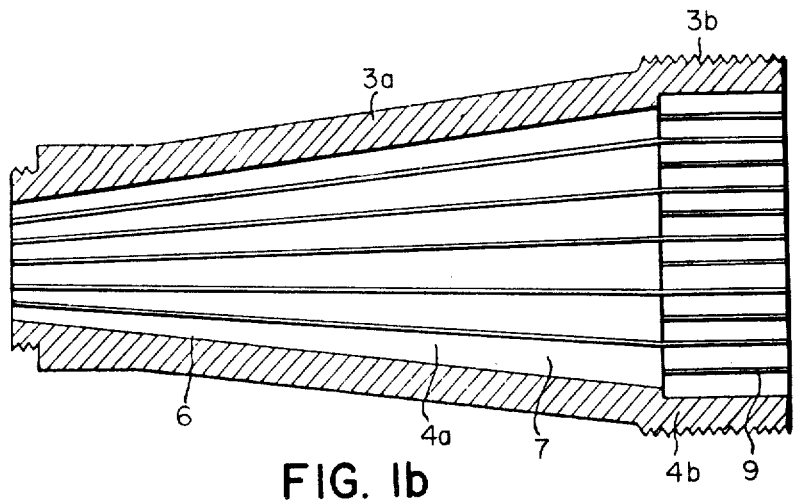
Figure 1C:
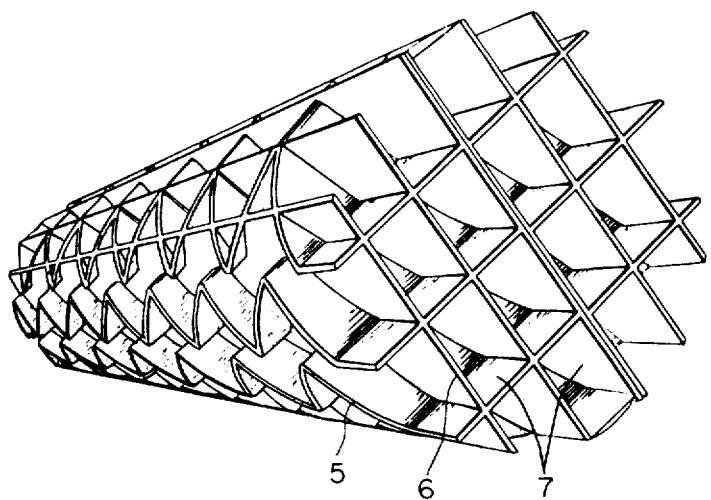
FIG. 1c is a perspective view of the truncated-cone portion of the means for attenuation provided according to this first design.

In FIGS. 1 through 3, the same parts are designated by the same reference numbers.

Referring to FIG. 1a, it shows a classical plug valve, in its entirety designated by 1, provided with a convergent element 2 upstream and with a partially divergent element 3 downstream. Elements 2 and 3 are both coaxial. The partially divergent element 3 comprises a truncated-cone portion 3a and a cylindrical portion 3b.

Figure 3A:
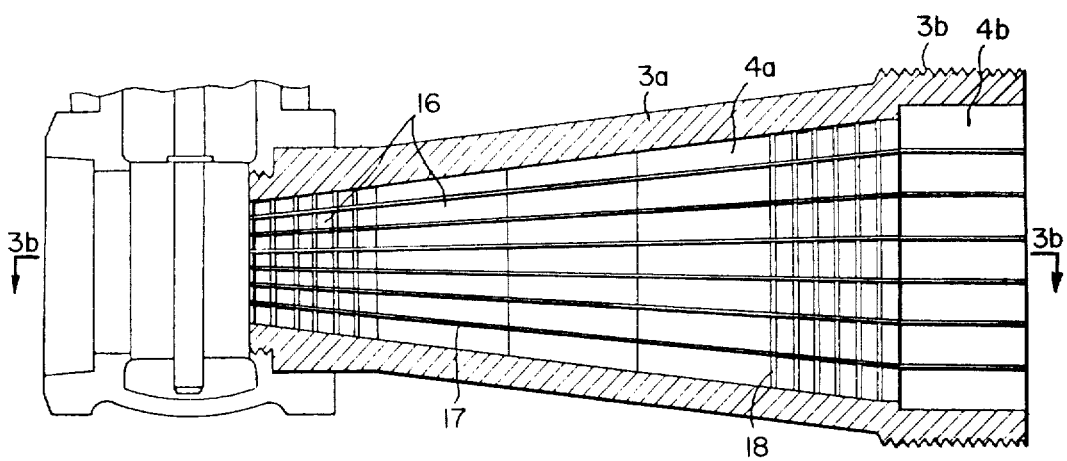
FIG. 3a is a vertical section of the third design of the device according to the invention.
Figure 3B:
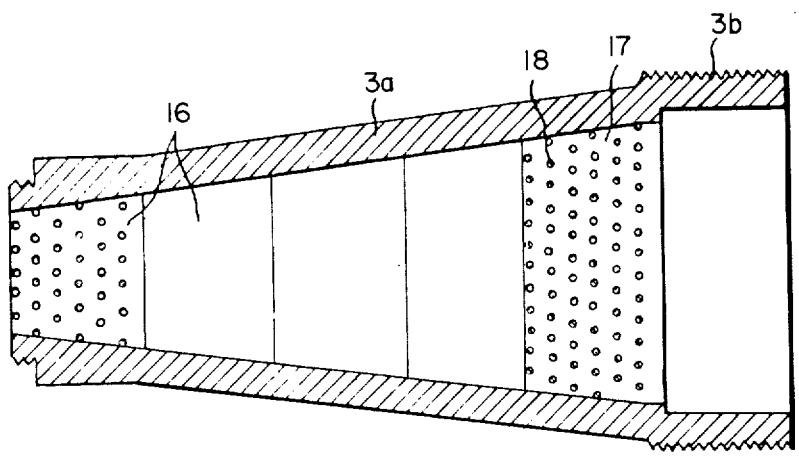
Figure 3C:
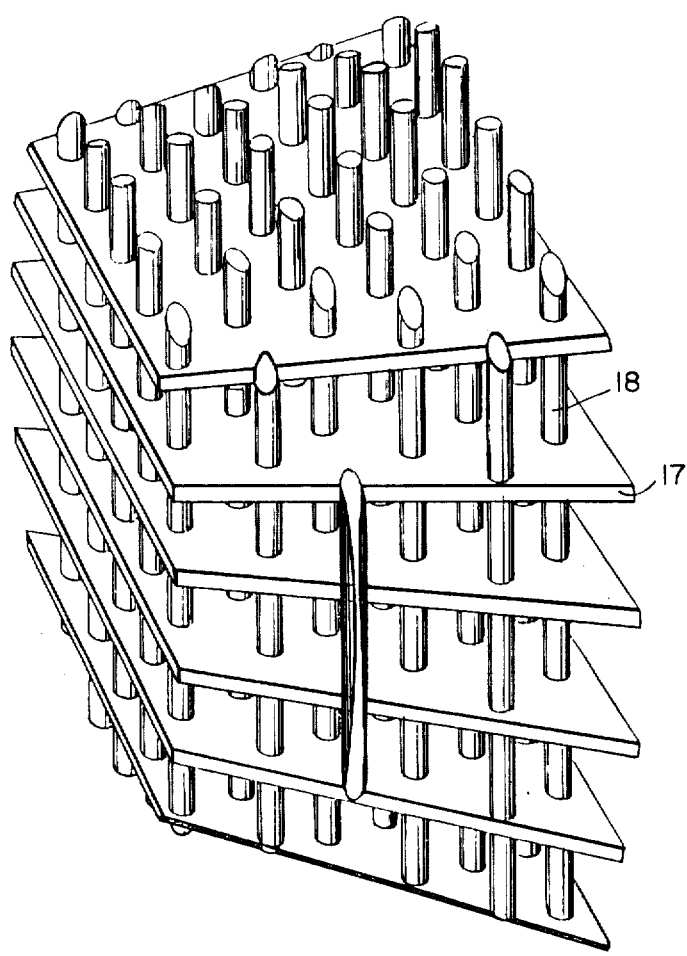
FIG. 3c is a perspective view of the truncated-cone block entering into the composition of the attenuating means provided in this third design.

As can be seen from FIGS. 3a and 3b, the partially divergent element 3 includes means for attenuating noise, of truncated-cone shape 4a, continued by means of a cylindrical shape 4b. The truncated-cone part 4a, represented in FIG. 3c, is the result of a combination of herringbone-pattern partitions 5 and plane partitions 6 which intersect, bounding between them zigzag passages 7 separated from each other. These passages 7 have a cross section which increases from upstream towards downstream.

As far as it is concerned, cylindrical part 4b is formed of plane partitions 8 and 9 which intersect perpendicularly.

It will be understood that when valve 1 is opened the access to one or several passages 7 of the attenuating means 4a is freed. Then the fluid enters these passages 7 constantly changing its direction owing to the zigzag configuration. While doing this, it expands progressively, without any undesirable increase of speed and, consequently, with a noise which has been reduced as far as is possible. The means of cylindrical shape 4b have the function of rendering the outflow speed of the fluid uniform.

Figure 2A:
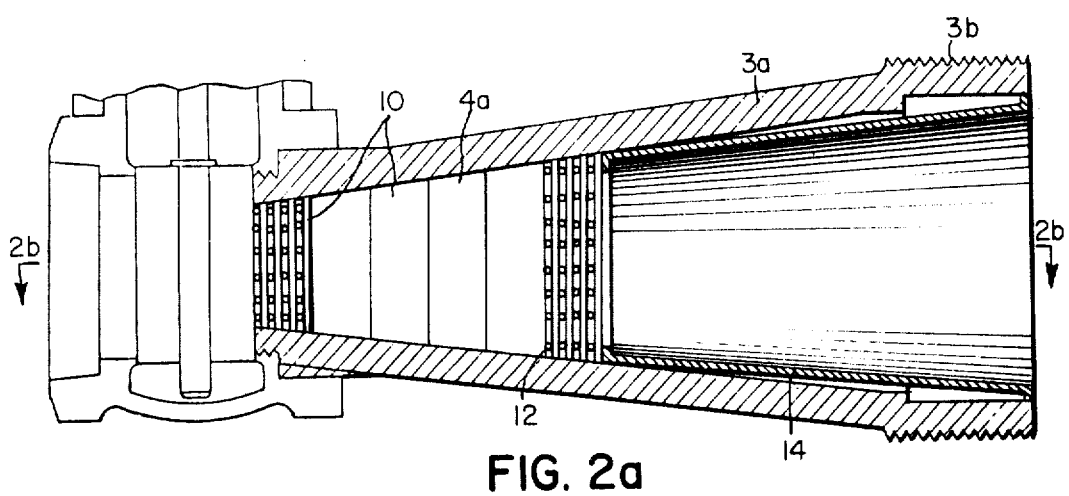
FIG. 2a is a vertical section of the second design of the device according to the invention.
Figure 2B:
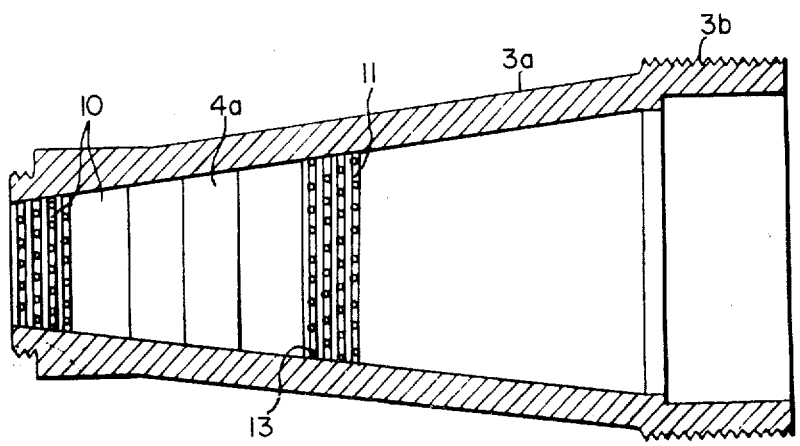

If FIGS. 2a and 2b are now considered, it is seen that the means for attenuation 4a are in a general form of truncated-cone shape and made by juxtaposition of six pancakes 10 of increasing diameters. Only the first and the last of these pancakes have been drawn. One of these pancakes 10 is represented in perspective in FIG. 2c. Each of the pancakes 10 is composed of a series of perforated plates 11 solidly joined to each other. Each plate is formed of a lattice resulting from the welding of criss crossed wires 12 and 13. As is evident from FIGS. 2a and 2b, inside one and the same pancake, the wires of the plates are displaced with respect to each other in such a way that straight-line passage is not possible for the fluid traveling through said plates. The fluid is constantly compelled to travel around the wires it comes up against, and to follow a winding path. It will be understood that said wires oblige the fluid to expand over the entire cross section of the pancake, even if the valve has been only slightly opened, as all passages are in communication. The six pancakes 10 are maintained in place in the cavity of the divergent tubular element 3 by a ring or by claws 14.

As an example, each of the pancakes may be of a thickness of the order of 15 to 20 mm and may be composed of wires of diameters of one or a few millimeters, the criss crossed wires of one and the same layer of the lattice being respectively at distances of a few millimeters from each other.

Figure 2C:
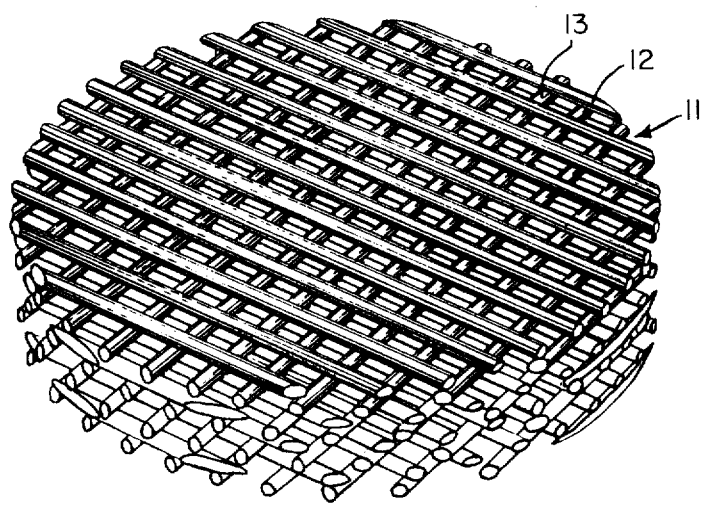
FIG. 2c is a perspective view of a pancake entering into the composition of the attenuating means provided according to this second design.

Instead of being displaced as is seen in FIG. 2c, i.e., with the wires of one plate remaining parallel to the corresponding wires of the preceding and following plates, the wires of a determined plate can also be angularly shifted.

If reference is now made to FIGS. 3a to 3c, it will be seen that the means for attenuation are composed of five truncated-cone blocks 16 of diameters which increase in the downstream direction. Each of these blocks results from the combination of plane partitions 17 and grids 18 formed of bars 19.

Inside one and the same truncated-cone block 16, the grids 18 are arranged in such a way that the bars of each of them are not aligned, on the longitudinal axis, with those of the preceding and following grids.

It will be understood that the plane partitions 17 divide the cavity of the tubular element 3 into several stories of passages 20, the access to which is freed by the opening of valve 1 and that the grids 18 present obstacles to the direct flow of the fluid in these passages. In each of passages 20 the fluid is thus constrained to travel around the bars 19.

According to this design, the means of cylindrical shape 4b are formed as extension of the plane partitions 17 which at this stage are parallel to the axis of the tubular element.

As an example, each of the truncated-cone blocks may be of a length of the order of 30 to 40 mm and be composed of partitions of thicknesses of one or several millimeters combined with grids, the bars of which have a diameter which also is in the vicinity of the thickness of said partitions. The distance between these bars may be equal to twice this thickness, and the space separating the partitions of one and the same block be close to said distance.

It is to be well understood that the orders of magnitude indicated above, as well as those mentioned in connection with the second design, are not limitative. One must, however, refrain from reducing the distance between the various obstacles provided in tubular element 3 (partitions, wires, or bars) below about 4 mm as beyond this lower limit risks of stoppage are to be feared, except, of course, if the fluid being transported is very pure.

The end of the means for attenuation 4a must be located as near as possible to, at most a one-tenth of one mm from, the outlet from the valve, in order for functioning of the assembly to be satisfactory.

Figure 4:
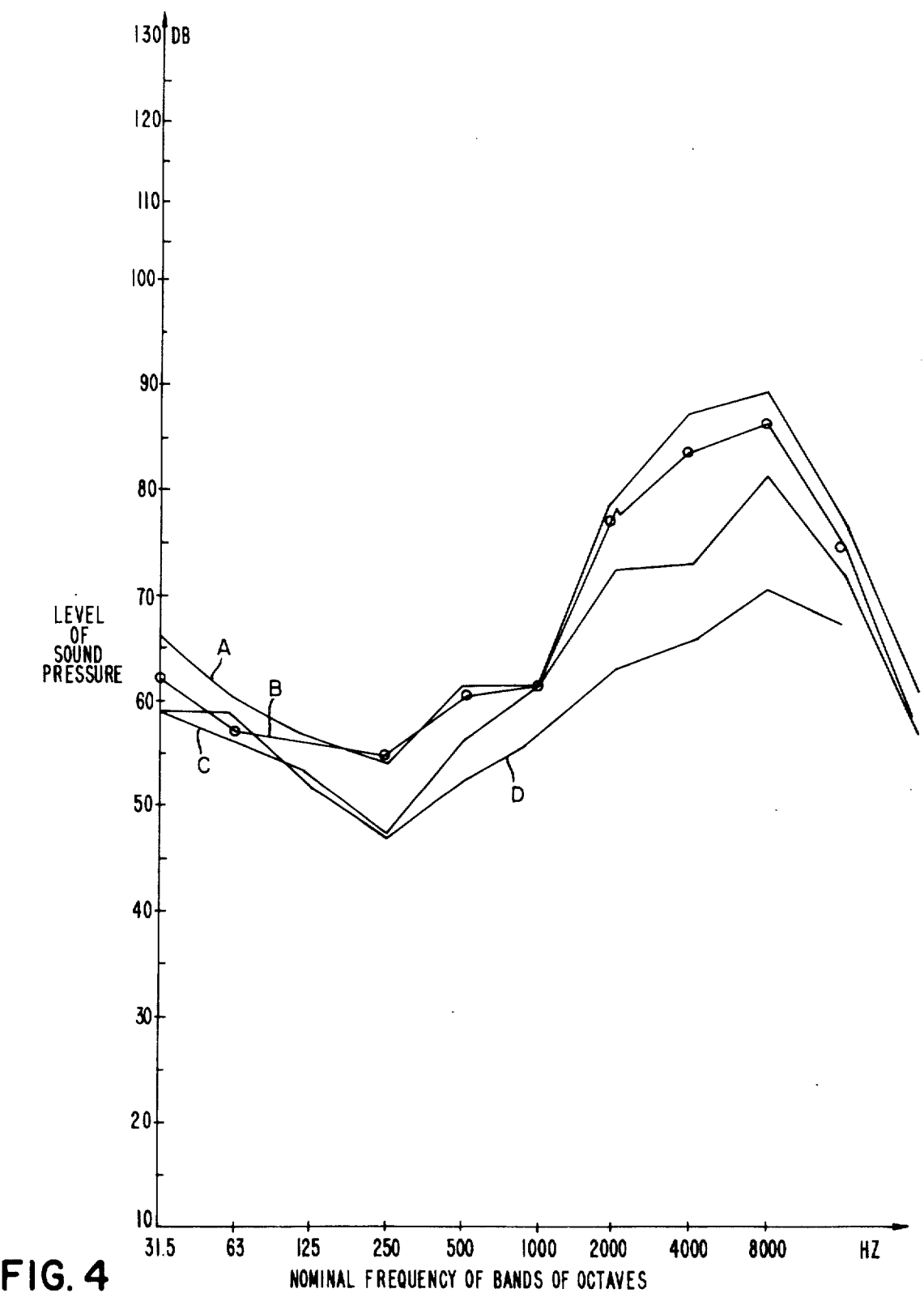
FIG. 4 is a graph showing, for a given ratio of pressure, the sound level pressure [along ordinate] as a function of the nominal frequency of bands of octaves, according to the number of pancakes forming the means for attenuation.

It can be considered that the effectiveness of the device is a function of its length. This statement follows from FIG. 4 which graphically presents the level of sound pressure SPL (dB) as a function of the nominal frequency of the octave bands (Hz).

This graph was determined by subjecting the attenuating device with pancakes in combination with a plug valve of 2 in. (50 mm) to experiments. The wires of the perforated plates were of a diameter of 1.8 mm and were spaced at 4 mm from each other. The pressure upstream was comprised between 4.8 and 5.2 absolute bars.

The level of sound pressure was measured 1 m downstream from the one or more pancakes, at 1 m from the pipe wall downstream.

It will be recalled that the level of sound pressure, expressed in dB, is equal to 20 times the logarithm to the base 10 of the ratio of the sound pressure of the source being considered to the level of sound pressure of a reference source taken equal to 0.0002 microbars.

In the graph:
Curve A corresponds to the use of a single pancake,
Curve B to the use of two pancakes,
Curve C to the use of three pancakes, and
Curve D to the use of four pancakes.

It clearly appears that, for a given pressure ratio, the level of sound pressure decreases in proportion as the number of pancakes increases, especially in the region of high frequencies.

Figure 5:
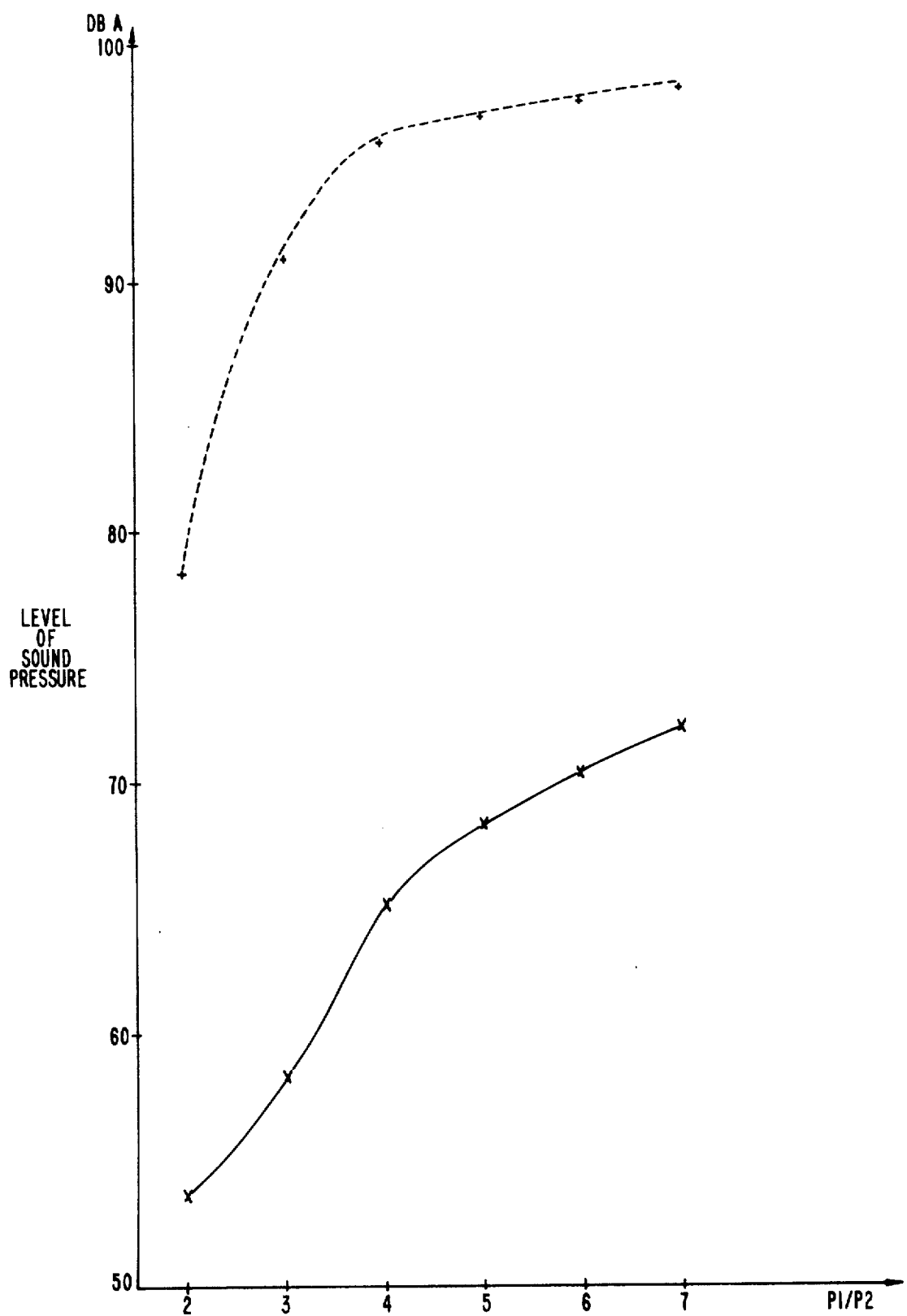
FIG. 5 is a graph comparing the sound level pressure as a function of the ratio: upstream pressure/downstream pressure, depending upon whether it is a classical valve or a valve provided with the device according to the invention.

The progress brought about by the device according to the invention follows from FIG. 5 which compares the level of sound pressure of a known regulating valve (Camflex) with that of a plug valve which is also known, but which has been provided with the device according to the invention.

In these two cases the CvCf of the valves was of the order of 24.

It will be recalled that:

Cv which is a flow coefficient is the number of U.S.A. gallons (3.785 liters) of water passing per minute through a restriction when the loss of charge during the passage through this restriction is 1 pound per square inch (0.069 bars).

Cf is the coefficient of critical flow which represents the rate of pressure recovery of a valve traversed by any fluid whatever and which is measured by laboratory test.

The graph shows the variation of the level of sound pressure SPL (expressed in dBA) as a function of the ratio between the absolute pressure P1 upstream and the absolute pressure P2 downstream, the broken-line curve corresponding to the Camflex valve and the fully-drawn curve to the plug valve equipped with the device according to the invention.

In this case, said device was composed of six pancakes placed inside a divergent element of a conicity of 24°.

As can be seen for certain ratios of P1/P2, the device according to the invention permits a gain of 30 dB to 40 dB.

It is to be well understood that the invention is not limited to the forms of carrying it out which have been described and represented. In particular, the sinuous passages of the means for attenuation could be made in any other way, i.e., with the help of perforated, cylindrical, thin plates, provided their configuration be such that it is not liable to involve stoppages. Elliptical shapes, or metal meshes having acute angles, must therefore be avoided. Moreover, it would be possible to put together means of attenuation from a combination of different elements, e.g., pancakes 10 and truncated-cone blocks 16. In place of pancakes 10 of increasing diameters, it would be possible to use pancakes of constant diameters, but of variable "porosity" or "opacity."

For this purpose it would be possible to use, from upstream towards downstream, pancakes formed of plates, the mesh of which would become larger and larger.

The variation of the dimensions of the mesh, in a plane perpendicular to the flow, permit the characteristic Cy to be easily modified as a function of the regular assembly.

On the other hand, instead of the plug valve represented, the device according to the invention could be associated with a valve of a different type, e.g., a scoop valve, a guillotine-type valve, a valve having a rotating or spherical clapper. Finally, the device according to the invention can be used as well for conveying a gas as a liquid.

As the invention has now been disclosed and its nature has been brought out by detailed examples, applicants reserve for themselves the exclusivity, during the entire duration of the patent, without any limitation other than that of the terms of the claims below.

We claim:

1. Throttling apparatus for reducing flowing fluid pressure with attenuation of fluid-expansion-generated noise and cavitation comprising, in combination, a pressure reducing valve having a downstream face;

means for attenuating the noise or cavitation generated by the expansion of fluid flowing through said valve to a downstream pipe, said attenuating means comprising an at least partially cone-shaped tubular member provided between said valve and downstream pipe, wire grill, sinuous passage forming means transversely spanning across and fitting within said member beginning substantially at said downstream face of said valve, said wire grill means defining a series of juxtaposed pancakes filling a length of said tubular member, each said pancake composed of a series of perforated plates solidly joined to each other, each said plate formed of a lattice of criss crossed wires, each said lattice comprising a first transverse plane layer of parallel straight wires and a second transverse plane layer of parallel straight wires oriented substantially at right angles to and being welded to said first transverse plane wire layer, the perforated plates of each said pancake being transversely arranged such that their wire lattices are displaced relative to those of the preceding and following plates to form said sinuous passages and whereby the fluid flowing through said tubular member is made to encounter and follow continuously winding paths around each succeeding plate layer, and means for retaining said wire grill pancakes in their said juxtaposed, substantially downstream-valve-face-engaged assembly in said tubular member, the open, continuously winding passages through the mesh forming lattice layers of the successively offset plates of said pancakes causing said fluid to undergo maximum expansion full across the entire cross-section of said pancakes under slightly open as well as under full open settings of said valve.

2. The apparatus of claim 1, wherein the lattice wires are spaced not less than about 4 millimeters apart.

3. The apparatus of claim 1, wherein said lattice wires have diameters of from one to a few millimeters.

4. The apparatus of claim 1, wherein 15-thickness of said pancakes is in the range 15-20 millimeters.

5. The apparatus of claim 1, wherein said plates are so oriented about the longitudinal axis of said tubular member that the parallel wires of one plate are angularly shifted from, or rotated to a different direction than, the corresponding parallel wires of the preceding and following plates.

6. The apparatus of claim 1, wherein the first of said downstream plates in said tubular element is positioned not more than about 0.1 millimeters from said downstream face of said valve.

7. The apparatus of claim 1, wherein said lattice wires are about 1.8 millimeters in diameter and have a spacing of about 4 millimeters.

8. The apparatus of claim 1, wherein towards said pipe said pancakes are either of increasing diameter or of constant diameter but increasing mesh.

9. The apparatus of claim 1, wherein said means for retaining said pancakes in said tubular member comprise a ring element received in said tubular member, engaging the last of said pancakes, and retaining said pancakes in juxtaposition to each other and with the first of said juxtaposed pancakes in said position of substantially engaging said downstream face of said valve.

* * * * *